United States Patent [19]

Mona et al.

[11] 4,231,862
[45] Nov. 4, 1980

[54] METHOD FOR THE PRESERVATION OF AN ACTIVATED SLUDGE

[75] Inventors: Roberto Mona, Bellinzona; Jürgen Gnieser, Weinfelden, both of Switzerland

[73] Assignee: Sulzer Brothers Limited, Winterthur, Switzerland

[21] Appl. No.: 22,691

[22] Filed: Mar. 22, 1979

[30] Foreign Application Priority Data

Apr. 3, 1978 [CH] Switzerland ............... 3530/78

[51] Int. Cl.³ ............................................. C02F 3/12
[52] U.S. Cl. ............................... 210/601; 210/603
[58] Field of Search ......................... 210/3–7, 210/10, 14, 15, 16, 11, 12

[56] References Cited

U.S. PATENT DOCUMENTS

| | | | |
|---|---|---|---|
| 3,623,975 | 11/1971 | Cardinal et al. | 210/6 |
| 3,960,717 | 6/1976 | Wyatt | 210/6 |
| 4,130,481 | 12/1978 | Chase et al. | 210/6 |

*Primary Examiner*—Thomas G. Wyse
*Attorney, Agent, or Firm*—Werner W. Kleeman

[57] ABSTRACT

A method for the preservation of activated sludge of a waste water purification stage, wherein preservation of such activated sludge is accomplished by flushing with a gas mixture containing at least carbon dioxide and a low oxygen content.

11 Claims, 1 Drawing Figure

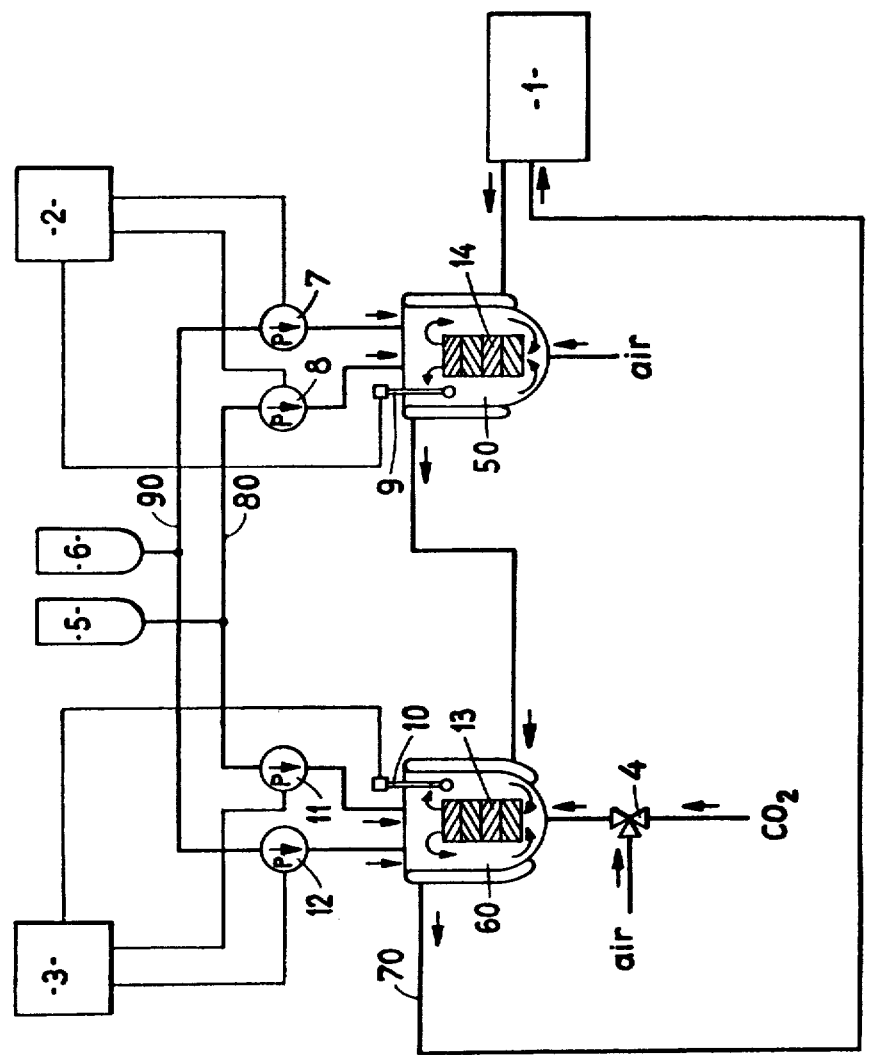

METHOD FOR THE PRESERVATION OF AN ACTIVATED SLUDGE

BACKGROUND OF THE INVENTION

The present invention relates to a new and improved method for the preservation of activated sludge for the reuse in waste water purification stages working according to the activated sludge process, wherein the activated sludge, which is to be preserved, is flushed with gas.

In the event that waste water purification stages must operate, in accordance with the activated sludge process, with pronounced fluctuating loads, with the band width of such fluctuations being relatively long, for instance amounting to a number of days, or if such waste water purification stages experience an interruption in the infeed of the raw waste water or sewage, in the order of equally a number of days, then upon sudden loading of the system or restarting thereof difficulties arise, because the aerobic microorganisms required for realizing the requisite degree of purification, are not available in the required amounts or with the necessary activity. During a relatively long start-up time such type stages therefore operate at reduced efficiency. In order to overcome this limitation it is known from German patent No. 2,446,289 and the article of J. Gnieser, entitled "Der spezifische Sauerstoffbedarf als Regelgrösse für aerobe biologische Systeme" (roughly translated as: "The Specific Oxygen Requirement as a Regulating Magnitude for Aerobic Biological Systems"), appearing in the publication "Chemische Rundschau", No. 6/1978, to store the excess active sludge which is always formed during the normal operation in a container and by aeration as well as, if needed, by the addition of nutrients to retain such active. When necessary, this sludge then can be again infed into the purification stage as additional activated sludge. If this reserve quantity of activated sludge is not continuously exchanged, because for instance there has arisen an interruption in the waste water or sewage, then there is required the addition of nutrients in conjunction with aeration, since otherwise the active retained biological mass would become continuously smaller due to self-respiration.

Preparation of the system components needed for the infeed of nutrients and the method operations during the nutrient infeed itself, require an additional expenditure for such type installations and processes.

SUMMARY OF THE INVENTION

Therefore, with the foregoing in mind it is a primary object of the present invention to provide a new and improved method of preserving activated sludge in a manner not associated with the aforementioned drawbacks and limitations of the prior art proposals.

Another and more specific object of the present invention aims at devising a novel method of preserving active, aerobic sludge wherein there can be dispensed with the need for such additional expenditure both as concerns the equipment and operation of the system.

Now in order to implement these and still further objects of the invention, which will become more readily apparent as the description proceeds, the method contemplates flushing the activated sludge with a gas which at least contains carbon dioxide ($CO_2$) and is low in its content of oxygen ($O_2$) in relation to air, and the flushing gas advantageously at most contains 10% by volume oxygen, at least 10% carbon dioxide and possibly as residual gas noble or rare gases and/or nitrogen up to 90% by volume.

The effectiveness of the novel method, wherein for the preservation of the activated sludge there is not required the addition of any nutrients, has been definitively demonstrated by the tests which will be discussed hereinafter in this disclosure. Although it was heretofore not possible to give any absolutely certain explanation why such happens, it is assumed that in the activated sludge of such type biological waste water purification stages there are present as microorganisms, in the first instance, so-called permissive aerobes which are capable of living both with as well as without oxygen. With an adequate oxygen partial pressure these organisms breathe like all other aerobic organisms, and there is formed as an end product of metabolism essentially carbon dioxide. With decreasing oxygen availability and the presence of carbon dioxide, which, as just mentioned, is formed during breathing, an increasingly greater number of such organisms successively change their metabolism to so-called fermentation processes, and the carbon dioxide concentration in the water surrounding the microorganisms markedly influences the nature of the then occurring fermentation process. This effect can be summarily considered as a slowing down of the metabolism processes, which then gradually, just as in the case of cooling or deep freezing, leads to a preservation of the original states, so that then there can be extensively prevented losses in biological mass due to self-respiration, as such arise during the sludge stabilization upon aeration. These changes in metabolism are reversible, i.e., these organisms again begin to breathe upon renewed offer of oxygen.

The above explanation of the procedures which occur in the activated sludge which is to be preserved during the novel method, makes it clear that the flushing gas advantageously can be the waste gas or waste gases of a biological waste water purification stage operated with air or oxygen and working according to the activated sludge process. In this regard, there is present the additional advantage that, firstly, the required carbon dioxide is available practically without any cost, and secondly, the annoying noxious smells which are possibly associated with such waste water purification installations are markedly reduced. However, it can also be useful to employ as the flushing gas industrially pure carbon dioxide.

If it is possible to predict ahead of time, for the waste water purification stage, an increase or renewed presence of the load, which is possible in many instances, such as for instance in the case of installations which are shut down over holidays and during the weekends for the purification of industrial waste water, then it is possible to achieve, at the proper point in time, activation of the preserved activated sludge if such, prior to its renewed utilization in such type purification stage, is flushed for a certain amount of time with a gas whose oxygen content at least corresponds to that of air.

In order to save space and equipment expenditure it is advisable if previously the activated sludge intended to be preserved, is thickened or concentrated. In order to carry out the novel method there can be used all conventional equipment and installations heretofore provided for aeration purposes, such as for instance mechanical or self-aspirated aerators and/or bubble columns. The infeed of gas and/or the mixing of the sludge can be improved if furthermore there are employed mechanical stirrers and/or static mixer elements or mixers for the performance of the method.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE schematically illustrates equipment for the practice of the inventive method.

DETAILED DESCRIPTION OF THE PREFERRED EMBODIMENTS

Referring now to the drawing, in the exemplary embodiment of equipment for practicing the inventive method, as shown in the single FIGURE, there will be seen two double wall-mixer vessels 50 and 60 of essentially the same geometry and having the same mixer elements, here shown by way of example as tubular gassers or gas applicators containing static mixers for the application of the gas and admixing, and generally indicated by reference characters 13 and 14 respectively. Instead of using the static mixers it would also be possible to employ stirrers. These elements 13 and 14 are known from aeration techniques. The two double wall-vessels 50 and 60 are connected in circuit with thermostat means 1, by means of the lines or conduits 70, as shown, in order to maintain the temperature of the vessels 50 and 60 essentially constant, as will be more fully explained hereinafter. At the lower end of the vessel 60 there is arranged a three-way valve 4 for the selective infeed of $CO_2$ and air and the other vessel 50 is provided with an infeed line for air. Obviously, a similar three-way valve 4 can be provided for the vessel 50 for the selective infeed of carbon dioxide and air.

Furthermore, each vessel 50 and 60 is provided with a pH-measuring and regulating device 2 and 3, respectively, which coacts with the pH-electrodes 9 and 10, respectively, arranged in the vessels 50 and 60 respectively. In order to maintain the pH-value, measured by the pH-electrodes 9 and 10, essentially constant and in the order of about for instance 6.5 to 7.5, there are provided the supply containers 5 and 6 for the respective infeed of approximately 5% by weight of sulfuric acid ($H_2SO_4$) and sodium hydroxide (NaOH). The supply container 5 for the sulfuric acid is operatively connected by the lines 80 with the feed or dosing pumps 8 and 11 coacting with the vessels 50 and 60, whereas the other supply container 6 for the sodium hydroxide is connected by the lines 90 with the feed or dosing pumps 7 and 12 associated with the vessels 50 and 60, respectively.

The two double wall-mixer vessels 50 and 60 are filled with the same quantity of activated sludge from a domestic or municipal biological waste water purification stage, and having a content of 1 g/l dry substance. There is assumed for this dry substance that at the start such contains for all tests the same quantity of biomass or biological mass, i.e., living organisms. This assumption is confirmed by the measurement results appearing in column 1 of the Table appearing at the end of this disclosure and as will be more fully described hereinafter.

The one stirrer or mixer vessel, such as vessel 50, is then infed with air, whereas the other vessel 60 employs for gassing industrially pure carbon dioxide ($CO_2$). The gas infeed rate amounts to 0.05 VVM (volume gas per unit volume of vessel and per minute, which is identical to 3 $Nm^3$ gas per $m^3$ and per hour ($Nm^3/m^3.h$)).

In order to confirm the activity of the sludge stored in each vessel 50 and 60 there is infed at certain time intervals to both vessels a substrate of defined composition. This substrate, by means of which there is delivered to the organisms especially organic carbon, consists of a peptone solution having a content of organic carbon amounting to 100 milligrams (mg) per gram (g) biological mass, i.e., as previously explained, per gram dry substance. Furthermore, there is additionally contained in the solution for each 100 mg of organic carbon also 0.01 mg phosphate in the form of disodium phosphate ($Na_2HPO_4.2\ H_2O$). The addition of the substrate solution occurs in surges by injection.

There is measured in both vessels 50 and 60 the speed of the carbon elimination i.e., the consumption of organic carbon after the addition of the substrate, and there is determined the time until reaching a static condition. The reduction of organic carbon is thus determined by removing samples at certain time intervals and subsequent analysis thereof in a commercial automatic analyzer for organic carbon.

For the performance of the measurement also the vessel, where during the storage or quiescent times, i.e., during the times when there is not infed any substrate, and into which there has been infed carbon dioxide, after infeed of the substrate surge is gassed with air, and specifically, for such length of time until the substrate surge is again decomposed.

The temperature of both vessels 50 and 60 is maintained constant at 15° C.±1° C. by the thermostat means 1 with the aid of the double wall or jacket of the vessels 50 and 60. The pH-value, measured by means of the electrodes 9 and 10, is maintained constant in the order of about 6.5 to 7.5 by the addition of 5% by weight NaOH or 5% by weight $H_2SO_4$ from the supply containers 6 and 5 respectively. The obtained results have been correlated together at the following Table, in the first column of which there has been plotted the preservation times in days (d), i.e., the age of the sludge since its removal from a purification stage which is in operation.

In the Table there have been indicated as the measurement results the times $t_{50}$ and $t_{95}$ which constitute the relevant times in hours which is required by the activated sludge in the vessel to again decompose about 50% and 95%, respectively, of the substrate surge or waste pulse.

The columns 1, 2 and 3 relate to respectively different preservation methods.

Column 1 of the Table indicates measurement results for preservation of the activated sludge by aeration without the infeed of any additional nutrients.

Column 2 gives measurement results for preservation of the activated sludge according to the novel method by utilizing carbon dioxide, wherein the $CO_2$-supply is carried out directly up to the point in time of the afore-discussed substrate infeed. At this point in time there is switched-over to the aforementioned gassing with air, which proceeds for such length of time until after such substrate surge there is again obtained in the preserved sludge an equilibrium state, i.e., there has been annihilated the disturbance caused by such surge.

Finally, Column 3 of the Table relates to activated sludge preservation, likewise according to the novel method, with carbon dioxide. However, here the gassing with carbon dioxide ($CO_2$) is switched to aeration approximately one hour prior to the substrate surge, in order to excite the aerobes of the microorganisms until the start of such surge. After reaching the new static condition, then, as in Column 2, there is again carried out gassing with carbon dioxide ($CO_2$).

The obtained results show that the preservation of the activated sludge by gassing with carbon dioxide affords appreciable advantages and then is particularly successful if the preserved activated sludge, prior to its renewed use in the presence of aerobic conditions, is again treated for a certain time, such as for instance about one hour as is the case in the illustrated embodiment, with air or a gas enriched with oxygen.

Furthermore, the approximately same times in the first line of the Table, measured for all three preservation methods, in the biological mass in the sludge after one day and determined for the times $t_{50}$ and $t_{95}$, in other words practically the biological mass in fresh sludge, demonstrates quite clearly that the aforementioned assumption of the same starting conditions was proper, i.e., there was present the same biological mass at the start for all of the three series of tests.

|   | 1 | | 2 | | 3 | |
|---|---|---|---|---|---|---|
| d | $t_{50}$ | $t_{95}$ | $t_{50}$ | $t_{95}$ | $t_{50}$ | $t_{95}$ |
| 1 | 0.25 | 1.06 | 0.24 | 1.02 | 0.26 | 1.08 |
| 4 | 1.1 | 4.8 | 0.5 | 2.2 | 0.4 | 1.8 |
| 9 | 6.7 | 29 | 0.9 | 3.75 | 0.7 | 3.3 |

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A method for the preservation of an activated sludge for the reuse in biological waste water purification stages, comprising the steps of:
    storing activated sludge which is to be preserved and subsequently introduced and used in a biological waste water purification stage;
    flushing the activated sludge with a gas to preserve the stored activated sludge prior to its use; and
    using as the flushing gas a gas containing at least carbon dioxide and to the extent that the flushing gas contains oxygen the flushing gas contains at least a reduced amount of oxygen in relation to air.

2. The method as defined in claim 1, further including the steps of:
    utilizing as the flushing gas a gas containing at most 10% by volume oxygen and at least 10% by volume carbon dioxide.

3. The method as defined in claim 2, further including the steps of:
    utilizing as the flushing gas a gas which additionally contains a residual gas selected from at least any one of the rare gases and nitrogen, or mixtures thereof, and present in an amount of up to 90% by volume.

4. The method as defined in claim 1, further including the steps of:
    utilizing as the flushing gas industrially pure carbon dioxide.

5. The method as defined in claim 1, wherein:
    there is employed as the flushing gas the waste gas of a biological waste water purification stage operated with air or oxygen and according to the activated sludge method.

6. The method as defined in claim 2, further including the steps of:
    there is employed as the flushing gas the waste gas of a biological waste water purification stage operated with air or oxygen and according to the activated sludge method.

7. The method as defined in claim 1, further including the steps of:
    flushing the preserved activated sludge, prior to its renewed use in an aerobic biological waste water purification stage, for a certain amount of time with a gas whose oxygen content corresponds at least to that of air.

8. The method as defined in claim 1, further including the steps of:
    previously concentrating the activated sludge intended to be preserved.

9. The method as defined in claim 1, further including the steps of:
    carrying out preservation of the activated sludge while intensively mixing the activated sludge.

10. The method as defined in claim 9, wherein:
    there is provided a vessel within which the activated sludge is intensively mixed.

11. The method as defined in claim 10, further including the steps of:
    employing for the mixing and the infeed of the gas a static mixer.

* * * * *